United States Patent [19]

Nivi et al.

[11] Patent Number: 4,688,528
[45] Date of Patent: Aug. 25, 1987

[54] RECIPROCATING BALANCE WEIGHT MECHANISM FOR A PISTON TYPE INTERNAL COMBUSTION ENGINE

[75] Inventors: Hossein Nivi, Windsor, Canada; Nathaniel L. Field, III, Northville, Mich.

[73] Assignee: Ford Motor Company, Dearborn, Mich.

[21] Appl. No.: 812,081

[22] Filed: Dec. 23, 1985

[51] Int. Cl.<sup>4</sup> ................... F16F 15/10; F16F 15/26
[52] U.S. Cl. ................... 123/192 B; 74/603; 74/604
[58] Field of Search ........... 123/192 B, 192 R; 74/603, 604

[56] References Cited

U.S. PATENT DOCUMENTS

| | | | |
|---|---|---|---|
| 1,929,104 | 10/1933 | Summers | 123/192 R |
| 1,958,148 | 5/1934 | Kjaer | 123/192 R |
| 2,632,340 | 3/1953 | Dolza et al. | 123/195 R |
| 2,666,420 | 1/1954 | Teisen | 123/192 B |
| 2,807,249 | 9/1957 | Peras | 123/192 B |
| 2,838,957 | 6/1958 | Johnson | 74/603 |
| 4,305,352 | 12/1981 | Oshima | 123/192 B |
| 4,508,069 | 4/1985 | Dobler et al. | 123/192 B |
| 4,523,553 | 6/1985 | Backlund | 123/192 B |

FOREIGN PATENT DOCUMENTS

| | | | |
|---|---|---|---|
| 2333038 | 1/1975 | Fed. Rep. of Germany | 123/192 R |
| 73644 | 4/1984 | Japan | 123/192 B |
| 397387 | 8/1933 | United Kingdom | 123/192 R |

Primary Examiner—Ira S. Lazarus
Attorney, Agent, or Firm—Jerome R. Drouillard; Roger L. May

[57] ABSTRACT

A balancing mechanism for reducing the vibration of a piston type internal combustion engine having a crankshaft and a camshaft comprises one or more reciprocating balance weights driven by two rotating cams with at least one of said cams being driven by either said crankshaft or said camshaft.

8 Claims, 8 Drawing Figures

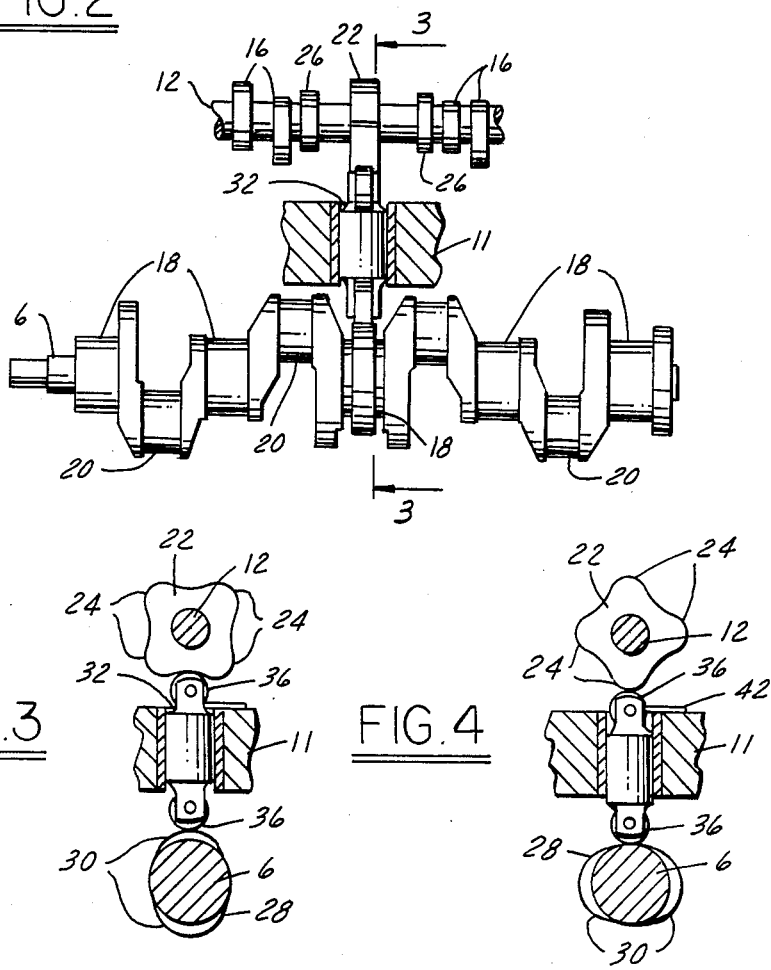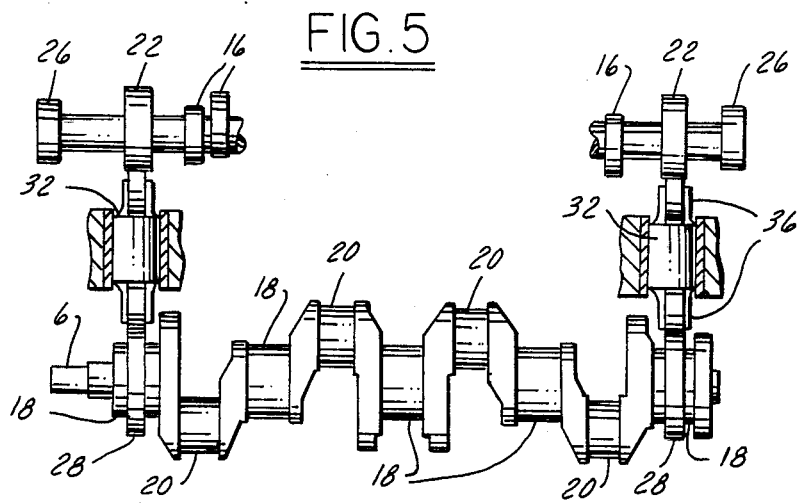

RECIPROCATING BALANCE WEIGHT MECHANISM FOR A PISTON TYPE INTERNAL COMBUSTION ENGINE

BACKGROUND OF THE INVENTION

1. Field of the Invention

This invention relates to a reciprocating balance weight mechanism for a piston type internal combustion engine in which one or more reciprocating balance weights are driven according to the motion of a rotating cam.

2. Disclosure Information

In certain types of engines, it is very difficult to completely dynamically balance all of the moving masses therein. In engines of this nature the primary forces and couples may not be compensated for by means of counterbalancing weights on the rotating crankshaft. Secondary unbalances produced in the engine have frequently been treated through the use of balance shafts provided in the engine. These balance shafts incorporate eccentric weights which are rotated along with the shaft at typically twice the speed of the engine's crank shaft to produce a rotating couple or force for counter balancing the disturbing couple. Such balance shafts typically comprise a solid bar that is disposed adjacent the camshaft of crankshaft with a pair of eccentric weights mounted on the opposite ends of the bar. The weights project from the bar and are rotationally displaced 180° from each other.

Although rotation of such a balance shaft has been found effective for balancing a rotating couple, the rotation of the eccentrically disposed weights produces bending of the solid shaft. This bending will result in radial deflections of the shaft which may be of considerable dimension, particularly at higher speeds. These deflections will cause the shaft to be bent into a somewhat S shape. This will result in the shaft moving from the desired axial alignment with the bearing supporting the shaft, thus imposing excessive loads on the bearings. These loads may cause excessive bearing wear and premature bearing failure. In addition, if the shaft is driven by a gear mounted on the shaft, the bending of the shaft will cause the gear to be deflected out of its proper plane of rotation. Thus, the gears will not be properly aligned and will not mesh properly. These factors will not only cause excessive wear but will also require more power to drive the shaft. Examples of balance shafts having the foregoing shortcomings are disclosed in the following U.S. Pats. Nos. 2,632,340; 2,838,957; 4,305,352; 4,508,069; and 4,523,553.

All of the previously known arrangements for balance shafts of the type thus far described suffer from yet another deficiency inasmuch as the multiple bearings required to properly suspend the shaft within the engine all consume engine power which would otherwise be available at the flywheel. This problem is further exacerbated by the fact that such balance shafts are commonly driven at twice the crankshaft speed which causes greatly increased frictional losses arising from shearing of the engine's lubricant at the bearing interfaces.

U.S. Pat. No. 1,958,148 discloses a device for counterbalancing or diminishing vibration occurring in stationary engine plants, in which a large mass block is elastically supported so that when excited by a cam operated lever means, the mass block and its spring mounting comprise a tuned absorber which will vibrate at a natural frequency determined by its own mass and the spring constant of the elastic mounting arrangement. Accordingly, the engine serves merely to excite the mass-spring system. This type of system is not suitable for operation at more than a small frequency range, and this would impose severe limitations on the available frequency response of such a system. In other words, the system of U.S. Pat. No. 1,958,148 would not be suitable to produce of damping needed with modern automotive engines, which operate at wide speed ranges.

It is an object of the present invention to provide a reciprocating balance weight mechanism for a piston type internal combustion engine which has reduced friction loss characteristics and no rotating bearings.

It is a further object of the present invention to provide a reciprocating balance weight mechanism having small packaging dimensions.

It is a further object of the present invention to provide a reciprocating balance weight mechanism which may be used to counteract both shaking forces and rocking couples of first, second and higher order harmonics all at once.

SUMMARY OF THE INVENTION

A balancing mechanism for reducing the vibration of a piston type internal combustion engine having a crankshaft and camshaft comprises one or more reciprocating balance weights driven according to the motion of a rotating cam with the cam driven by either the crankshaft or camshaft of the engine. The driving cam is preferably integral with either the camshaft or the crankshaft. The reciprocating balance weights are preferably driven by two rotating cams with at least one of the cams being driven by either the engine crankshaft or the camshaft. In one embodiment a crankshaft operably associated with one or more piston and connection rod assemblies has one or more multiple-lobed cams attached to it. A camshaft driven by and synchronized with the crankshaft and having one or more intake or exhaust valves operably associated with it has one or more multiple-lobed cams attached to the camshaft. One or more linearly actuatable balance weights mounted within the engine is driven reciprocably by a pair of cams comprising one of the multiple-lobed cams attached to the crankshaft and one of the multiple-lobed cams attached to the camshaft. Thus, the linearly actuatable balance weights preferably reciprocate between a pair of said multiple-lobed cams.

Linearly actuatable balance weights suitable for use with the present invention preferably comprise a generally elongate body having a cam follower mounted at either end.

BRIEF DESCRIPTION OF THE DRAWINGS

FIG. 2 is a cut-away view of the crankshaft, camshaft and balance weight mechanism of the engine shown in FIG. 1, taken along the line 2—2 of FIG. 1.

FIGS. 3 and 4 are elevations taken along the line 3—3 of FIG. 2.

FIG. 5 is similar to FIG. 2 and shows an alternate arrangement of the balance weight mechanism of the present invention employing multiple balance weights.

DESCRIPTION OF THE PREFERRED EMBODIMENTS

Figure 1:
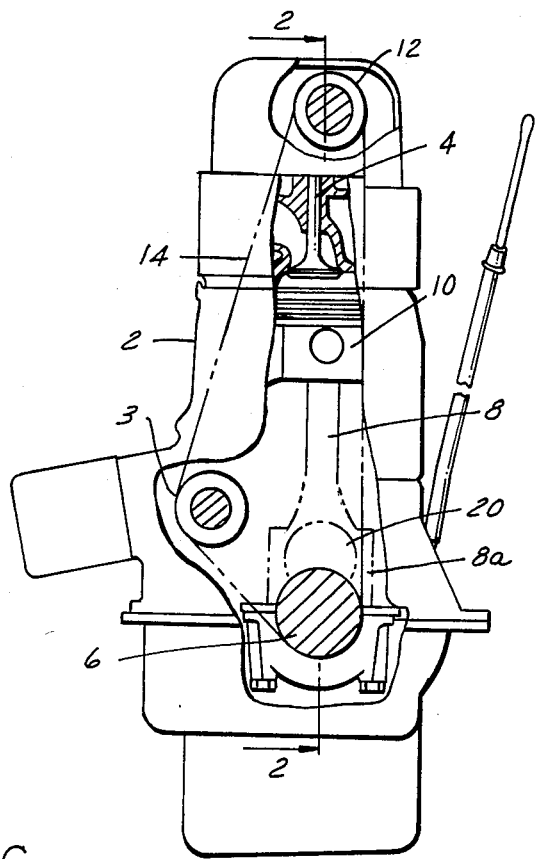
FIG. 1 is a cut-away end elevation of an internal combustion engine including the present invention.

FIG. 1 depicts a typical internal combustion engine which is suitable for application of a reciprocating balance weight mechanism according to the present invention. Engine 2 is equipped with poppet type valves 4 which are actuated by a valve train mechanism driven by camshaft 12. The camshaft is driven by crankshaft 6 via timing chain or belt 14 which runs over idler pulley 3 as well. Connecting rod 8 and piston 10 are associated with crankshaft 6. The lower end of the connecting rod 8a is attached to connecting rod journal 20 of the crankshaft. Moving now to FIG. 2, it is seen that crankshaft 6 is shown in a configuration suitable for a four cylinder engine inasmuch as the crankshaft has four connecting rod journals 20 and five main bearing journals 18. Those skilled in the art will appreciate, however, in view of this disclosure that the reciprocating balance weight mechanism according to the present invention could be employed with engines having not only inline but also V-type configurations having various numbers of cylinders including odd and even numbers of cylinders. The reciprocating balance weight mechanism according to the present invention is suitable for use with not only gasoline internal combustion engines but also those employing diesel combustion principles and is further suitable for engines using not only carburetors in the conventional manner but also fuel injection systems, turbo-chargers, or other arrangements for fuel delivery. The present system could be employed beneficially with other reciprocating machines as well, such as piston type gas compressors. Those skilled in the art will further appreciate that the reciprocating balance weight mechanism according to the present invention is suitable for use not only with engines having a camshaft located in the engine's cylinder head as shown in FIG. 1, but also those having camshafts mounted within the cylinder block. In such a case, the balance weight could be driven by a linkage mechanism operated by the crankshaft and the camshaft.

As shown in FIG. 2, camshaft 12 has a number of lobes 16 for operating engine valves 4. The camshaft is rotated upon bearing journals 26 within the engine block.

The balance weight mechanism according to the present invention is preferably driven by multiple-lobed cams attached to the crankshaft and camshaft. Accordingly as shown in FIGS. 2-6, Multiple-lobed cam 22 is attached to camshaft 12 and multiple-lobed cam 28 is attached to crankshaft 6. Although FIGS. 2 and 5 show different arrangements for the balance weight mechanism according to the present invention, the reference numerals have been maintained constant in these figures to promote clarity in this disclosure.

FIG. 2 shows a single reciprocating balance weight mechanism, whereas FIG. 5 shows a double balance weight mechanism according to the present invention. Modern automotive internal combustion engines are required to operate at high speed with a minimum of vibration. This requirement necessitates accurate and complete balancing of the unbalanced forces and couples set up by rotating and reciprocating masses within the engine. It is well known that if the forces and couples of an engine are not balanced, excessive vibration will result. This vibration greatly increases the wear on engine parts and reduces the life of the engine.

Engines may be out of balance, with resulting vibration and excessive wear, due to either unbalanced forces or unbalanced couples. The unbalanced forces may be "primary" or those operating at engine speed, or may be higher order forces which are classified as "secondary", "tertiary", etc. corresponding to the particular harmonic of engine speed at which they are observed. The term "unbalanced couple" as here applied, is the equivalent of a torque or moment applied to a rigid structure. These couples may be either so called "shaking" couples which are manifest by forces acting in a single plane lying in the longitudinal axis of the engine or they may be rotating couples which change their direction of application with respect to the center of the engine either at engine speed or at some harmonic thereof.

By means of examples, two engines which are well-suited for use with the balance weight mechanism according to the present invention are the 90° V-6 and 4 cylinder in-line automotive engines. For a 90° V-6 engine, shaking forces are balanced. These engines do, however, exhibit an unbalanced couple. Elimination of this unbalanced couple will require use of the two balance weight mechanisms as shown in FIG. 5. The balance mechanisms will generate a couple phased so as to oppose that couple created by the other parts of the engine. Because the unbalanced couple will have both primary and secondary manifestations, the profiles of the multiple-lobed cams attached to the camshaft and crankshaft may be contoured so as to provide both primary, secondary and higher order actuation of the balance masses. Accordingly, if the primary lift contour of each multi-lobed cam is viewed as a primary sinusoidal function, a second sinusoidal function of lesser magnitude could be superimposed upon the primary function to give a secondary (i.e., higher order harmonic) actuation capability.

It has been found that the unbalanced couple of a V-type engine may produce objectionable vibration only at one end of the engine when, for example, the engine is installed in the "north-south" configuration in a rear-drive motor vehicle. In this event, a balance mechanism according to the present invention may be advantageously employed at only a single end of the crankshaft so as to economically eliminate vibration without the necessity of a second balance weight mechanism.

Four cylinder engines are usually designed such that primary shaking forces are unbalanced but so that there are no primary unbalanced couples. Accordingly, because it is usually the desire of the designer to minimize cost and weight in four cylinder engines, a single balance weight mechanism could be employed as shown in FIG. 2 for a four cylinder engine. In this manner the secondary shaking forces will be canceled at minimal cost.

FIGS. 3 and 4 illustrate the nature of the movement of the balance weight mechanism. As shown in these figures, the balance weight moves reciprocably between the multiple-lobed cams carried on the crankshaft and camshaft. No springs or other devices are needed to maintain the balance weight mechanism in the desired location because the balance weight is captured between the two multiple-lobed cams which are synchronized with the crankshaft and camshaft so that the weight merely oscillates back and forth between the cams. As may be readily observed from FIGS. 3 and 4, multiple-lobed cam 22 carried on camshaft 12 has four lobes 24, whereas multiple-lobed cam 28 carried upon crankshaft 6 has two lobes 30. Those skilled in the art will recognize that these configurations are necessitated by the fact that the camshaft of a four cycle internal combustion engine rotates at half the rotational speed of the crankshaft of a four cycle engine. In the event, however, that the balance weight mechanism according to the present invention is employed with a two cycle or, more properly, a two-stroke cycle internal combustion engine, the multiple-lobed cams carried on the camshaft and crankshaft would have an identical number of lobes because the camshaft and crankshaft of a two-stroke cycle engine rotate at the same velocity. Moreover, those skilled in the art will appreciate in view of this disclosure that a balance weight mechanism according to the present invention could be driven with a single cam with reciprocation assured by a spring loaded mechanism to return the balance weight to its original position folowing each stroke imposed by the cam.

Figure 6:
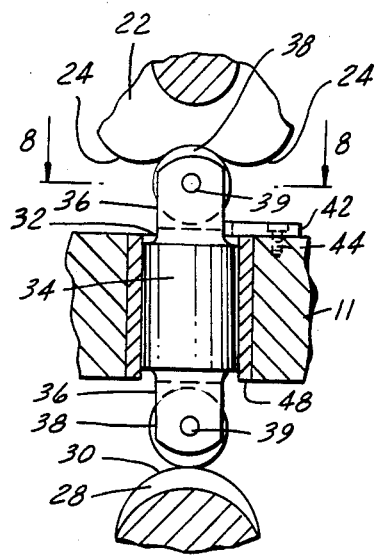
FIG. 6 is an enlarged view similar to FIGS. 3 and 4 showing greater detail of the reciprocating balance weight employed with the present invention.
Figure 7:
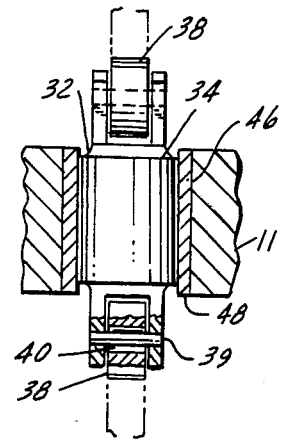
FIG. 7 is a side elevation of the balance weight shown in FIG. 6.
Figure 8:
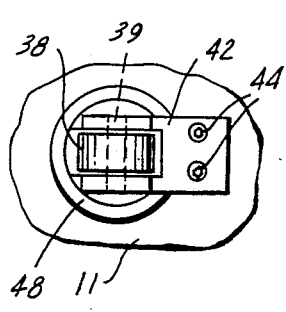
FIG. 8 is a plan view of the balance weight of FIG. 6 taken along the line 8—8 of FIG. 6.

Turning now to FIGS. 6–8, the details of construction of the balance weight mechanism are shown. As shown in these figures, the balance weight comprises a generally elongate body 34, in this case preferably having a cylindrical configuration. Those skilled in the art will appreciate however, in view of this disclosure that the configuration of the weight may be adjusted to accommodate varying circumstances within the engine which the balance weight mechanism is being applied. Elongate body 34 reciprocates within a bore 36 provided within the engine structure 11. Bronze bearing 48 is employed for the purpose of lining bore 46 to provide a smooth bearing surface for the reciprocation of the balance weight. Other materials are, of course, suitable for use as bearing material. A cam follower 36 is employed at either end of elongate body 34 for the purpose of maintaining contact with each multiple-lobed cam. Each cam follower comprises a roller 38 attached to elongate body 34 with roller shaft 39 and further equipped with needle bearing 40. This arrangement with rollers and needle bearings provides a very low friction mechanism capable of damping vibration without absorbing excessive amounts of power from the engine. Those skilled in the art will recognize in view of this disclosure that other cam follower arrangements could be employed with the present invention including conventional flat tappets.

Because elongate body 34 has a circular cross-section, guide plate 42 is provided to maintain the proper alignment of the rollers with the multiple-lobed cams. The guide plate is attached to the engine with screws 44 and assures that the elongate body will not rotate within bearing 48.

While we have shown and described only two embodiments in accordance with the present invention, it is understood that the same is not limited thereto but is susceptible to numerous changes and modifications as known to one having ordinary skill in the art, and we, therefore, do not wish to be limited to the details shown as described herein, but intend to cover all such modifications as are encompassed by the scope of the appended claims.

We claim:

1. A balancing mechanism for reducing the vibration of a piston type internal combustion engine having a crankshaft and a camshaft, said balancing mechanism comprising one or more reciprocating balance weights, with each weight comprising an elongate body having a cam follower mounted at either end and with each weight being driven by two rotating cams with at least one of said cams being driven by either said crankshaft or said camshaft.

2. The balancing mechanism according to claim 1, wherein at least one of said cams is integral with either said crankshaft or said camshaft.

3. An internal combustion engine comprising:
   a crankshaft operably associated with one or more piston and connecting rod assemblies having one or more mulitiple-lobed cams attached thereto;
   a camshaft driven by, and synchronized with, said crankshaft and having one or more intake or exhaust valves operably associated therewith, with said camshaft further comprising one or more multiple-lobed cams attached thereto; and
   one or more linearly actuatable balance weights mounted within said engine such that said weights are driven reciprocably by a pair of cams comprising one of said multiple-lobed cams attached to said crankshaft and one of said multiple-lobed cams attached to said camshaft.

4. The internal combustion engine according to claim 3, wherein each of said multiple-lobed cams attached to said crankshaft has two lobes and each of said multiple-lobed cams attached to said camshaft has four lobes.

5. The internal combustion engine according to claim 3, wherein said crankshaft has a multiple-lobed cam attached at either end driving one of said balance weights in conjunction with a multiple-lobed cam attached to said camshaft.

6. The internal combustion engine according to claim 3, wherein each of said linearly actuatable balance weights reciprocates between said pair of multiple-lobed cams.

7. The internal combustion engine according to claim 6, wherein each of said linearly actuatable balance weights comprises a generally elongate body having a cam follower mounted at either end.

8. The internal combustion engine according to claim 7, wherein each of said cam followers comprises a roller.

* * * * *